J. M. SCHOONMAKER, Jr.
CLUTCH MECHANISM.
APPLICATION FILED FEB. 24, 1909.
981,010.
Patented Jan. 10, 1911.
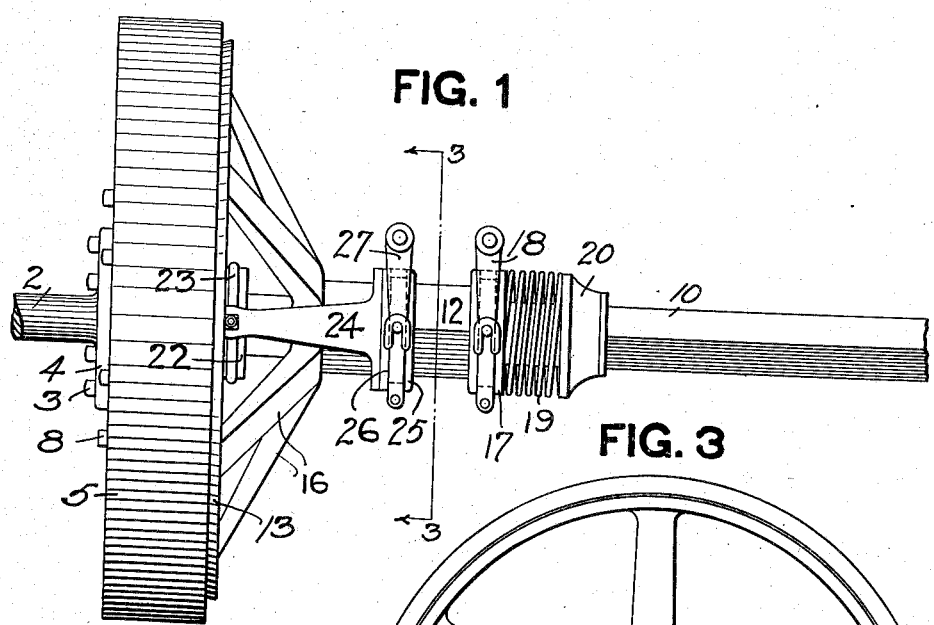
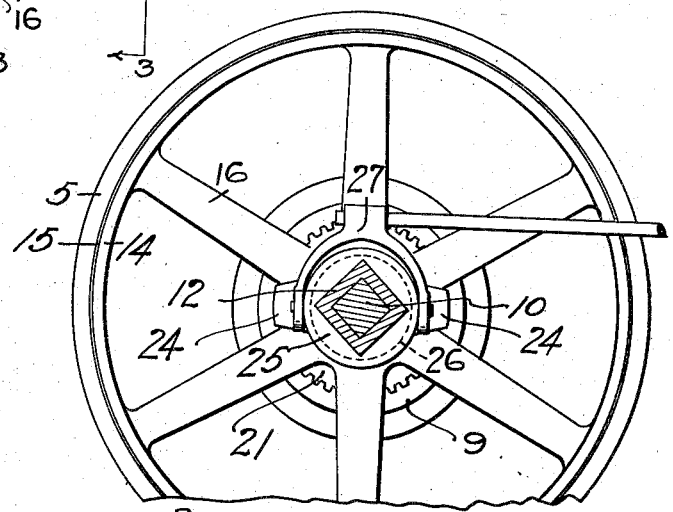
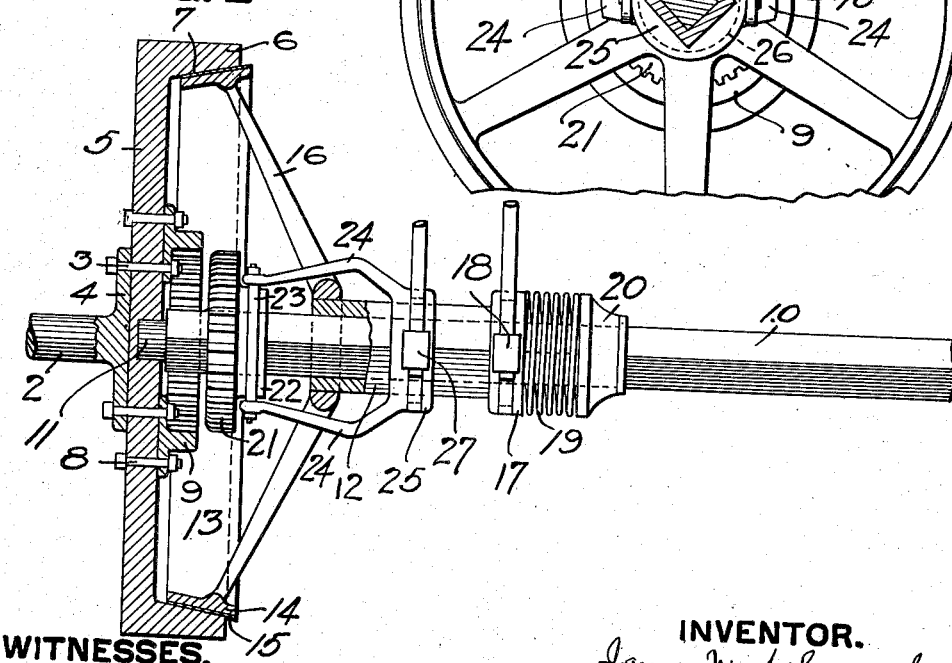
WITNESSES.
INVENTOR.

UNITED STATES PATENT OFFICE.

JAMES M. SCHOONMAKER, JR., OF PITTSBURG, PENNSYLVANIA.

CLUTCH MECHANISM.

981,010.  Specification of Letters Patent.  Patented Jan. 10, 1911.

Application filed February 24, 1909. Serial No. 479,766.

*To all whom it may concern:*

Be it known that I, JAMES M. SCHOONMAKER, Jr., a resident of Pittsburg, in the county of Allegheny and State of Pennsylvania, have invented a new and useful Improvement in Clutch Mechanism; and I do hereby declare the following to be a full, clear, and exact description thereof.

My invention relates to clutch mechanism, its object being to provide a strong and durable construction which will be capable of standing severe strain and of transmitting power without liability of slipping when subjected to a heavy load.

In an application of even date herewith, Serial No. 479,764, I have illustrated my improved clutch mechanism as applied to an automobile fire engine and while it is particularly applicable to such a device where it is desired to have a clutch which may be controlled with perfect ease when traveling to or from a fire, and at the same time one which cannot slip when pumping where the load is very much greater, it may be employed for other purposes.

To these ends my invention comprises the novel features hereinafter set forth and claimed.

Referring to the drawings Figure 1 is a side view of my improved clutch mechanism; Fig. 2 is a longitudinal view partly in section; and Fig. 3 is a section on the line 3—3 Fig. 1 looking in the direction of the arrows.

In the drawings the numeral 2 designates a shaft driven by an engine or other motor and connected to said shaft by means of bolts 3 passing through the flange 4 is the driving member or fly-wheel 5, as it may be termed. This driving member 5 has the rim 6 and on the inner face of said rim is the tapering face 7. Secured to the inner face of the driving member 5 by means of the bolts 3 as well as the bolts 8 is the internal gear 9. A shaft 10 which is illustrated as square in cross section has the round end portion 11 which is adapted to enter a seat in the driving member 5 so that the driving member may rotate upon the shaft 10 without driving the same when the clutch members are not in engagement with said driving member, and at the same time the shafts are kept in alinement. A slidable sleeve 12 is mounted on the shaft 10, said sleeve being likewise square in cross section, although it is apparent that both the shaft 10 and the sleeve 12 might be round in section with the ordinary feather and groove connection.

Secured to the sleeve 12 is the friction clutch-member 13 which is provided with the conical rim 14 adapted to engage the tapering face 7 of the rim 6 of the driving member 5. A ring 15 of leather or other suitable material may be interposed between the conical rim 14 and the tapering face 7. The spokes 16 of the clutch member 13 converge from the rim of the clutch member 13 as indicated so as to provide for the other clutch member, as will more fully hereinafter appear. The sleeve 12 is provided with the grooved annulus 17 with which an ordinary clutch yoke and lever 18 is adapted to engage for sliding the sleeve 12 and throwing the clutch member 13 out of engagement with the driving member 5. A spring 19 is interposed between the sleeve or clutch-ring 17 and the collar 20 on the shaft 10. This collar 20 may be forged integrally with the shaft 10 or secured thereto in any suitable manner.

A second clutch-member consists of the spur gear 21 which is adapted to slide on the shaft 10 and said spur gear is adapted to be thrown into engagement with the internal gear 9 of the driving member 5. The grooved ring or collar 22 is formed integral with the spur gear 21 or suitably secured thereto, and a split-ring 23 is adapted to engage the groove in the collar 22. Arms 24 connect the split-ring 23 with the collar 25 slidable on the sleeve 12. This collar 25 is provided with a groove 26 with which the ordinary clutch-yoke and lever 27 engages for moving the clutch-member 21 back and forth on the shaft 10.

When my improved clutch mechanism is in use for ordinary purposes it may only be necessary to have the clutch-member 13 in engagement with the driving member 5 and said clutch-member will be normally held in engagement with said driving member by means of the spring 19. When it is desired to throw the clutch member 13 out of engagement with the driving-member 5 it is only necessary to operate the clutch lever 18 in the ordinary manner. When, however, the load is increased and it is necessary to prevent any possibility of the slipping of the clutch-member 13 the clutch-member 21 or spur gear is thrown into engagement with the internal gear 9 of the driving member. This is readily effected by means of the clutch-lever 27. In this way an absolutely positive engagement is made between the shaft 10 and the driving member so that all liability of the slipping is removed, due to increase in the load. As the driven-member 13 when driven by the driving-member 5 will be rotated at the same rate of speed as the clutch-member 21 the engagement of the clutch member 21 with the internal gear 9 will be effected without any undue jarring or danger of stripping gears. When the connection between the clutch-member 21 and the driving-member has been effected an absolutely positive drive is obtained which, especially in the case of a fire-engine, is very necessary as all liability of slipping must be removed in order to work the pump up to its highest efficiency.

What I claim is:

1. In clutch mechanism, the combination of a driving shaft, a friction clutch-member secured to said shaft, a driven shaft having a bearing in said clutch-member, a spring actuated sliding clutch-member on said driven shaft, a positive sliding clutch-member on said driven shaft, a corresponding clutch-member on the first named driving clutch-member with which said positive clutch-member is adapted to engage, and independent means for operating said clutch-members.

2. In clutch mechanism, the combination of a driving shaft, a friction clutch-member secured thereto, a driven shaft, a slidable sleeve on said driven shaft, a friction clutch-member carried by said slidable sleeve, a spur-gear engaging directly with said driven shaft, a slidable frame on said sleeve, connections between said slidable frame and said spur-gear, an internal gear secured to said first named friction clutch-member, of less diameter than said second friction clutch-member, and independent means for operating said second clutch-member and said spur-gear.

3. In clutch mechanism, the combination of a driving shaft, a friction clutch member secured to said shaft, a driven shaft, a slidable friction clutch member on said driven shaft, the spokes of said last named clutch-member converging from the rim thereof, a positive friction clutch-member mounted directly on said driven shaft, and slidable thereon, said positive clutch-member being inside the spokes of said friction clutch-member, a clutch member with which said positive clutch-member is adapted to engage, and means for operating said clutch-members.

In testimony whereof, I the said JAMES M. SCHOONMAKER Jr have hereunto set my hand.

JAMES M. SCHOONMAKER, JR.

Witnesses:
D. M. McLEOD,
J. FRANCIS SULLIVAN.